United States Patent [19]
Grubeck et al.

[11] Patent Number: 6,009,334
[45] Date of Patent: Dec. 28, 1999

[54] METHOD AND SYSTEM FOR DETERMINING POSITION OF MOBILE RADIO TERMINALS

[75] Inventors: Hans Grubeck, Solna, Sweden; Sven Fischer, Nürnberg, Germany; Patrik Lundqvist, Stockholm, Sweden

[73] Assignee: Telefonaktiebolaget L M Ericsson, Stocklholm, Sweden

[21] Appl. No.: 08/978,960

[22] Filed: Nov. 26, 1997

[51] Int. Cl.[6] .............................. H04M 11/00; G01S 3/02
[52] U.S. Cl. .......................... 455/456; 455/440; 342/457
[58] Field of Search .................................... 455/427, 428, 455/456, 457, 523, 424, 446, 67.1, 67.6, 226.1; 342/387, 457

[56] References Cited

U.S. PATENT DOCUMENTS

| | | | |
|---|---|---|---|
| 4,433,335 | 2/1984 | Wind | 343/463 |
| 4,488,593 | 12/1984 | Friedman | 342/387 |
| 5,327,144 | 7/1994 | Stilp et al. | 342/387 |
| 5,512,908 | 4/1996 | Herrick | 342/451 |
| 5,526,357 | 6/1996 | Jandrell | 370/95.2 |
| 5,534,876 | 7/1996 | Erickson et al. | 342/387 |
| 5,687,196 | 11/1997 | Proctor | 375/347 |

FOREIGN PATENT DOCUMENTS

| | | |
|---|---|---|
| 0 318 685 A2 | 6/1989 | European Pat. Off. . |
| WO 97/11384 | 3/1997 | WIPO . |

*Primary Examiner*—Paul Loomis
*Assistant Examiner*—Nick Corsaro
*Attorney, Agent, or Firm*—Jenkens & Gilchrist, P.C.

[57] ABSTRACT

A method and apparatus are disclosed for determining more accurately, in a radio environment with time dispersion, the distance between a radio receiver and radio transmitter, by special processing of received radio signals that have been transmitted repeatedly from the same radio transmitter and are possibly subject to multipath propagation. The Time of Arrival (TOA) of the received radio signals is repeatedly estimated using channel power profiles. A TOA value near the minimum occurring TOA is selected wherein each estimated TOA is derived from incoherent integration of a randomly chosen number of the received bursts having the same known bit sequence, in order to eliminate the influence of noise.

18 Claims, 5 Drawing Sheets

METHOD AND SYSTEM FOR DETERMINING POSITION OF MOBILE RADIO TERMINALS

BACKGROUND OF THE INVENTION

1. Technical Field of the Invention

The present invention relates in general to the mobile radio communications field and, in particular, to a method and system for use in determining the geographical position of a mobile radio terminal.

2. Description of Related Art

Commonly-assigned U.S. patent application Ser. No. 08/917,577 to Hagerman et al., describes a method for determining the position of a mobile radio terminal (hereinafter mobile station or MS), which makes use of uplink Time of Arrival (TOA) and Direction of Arrival (DOA) measurements. Slight mention is made in that disclosure about repeating the same uplink signal a number of times, in order to improve the accuracy of the TOA determinations. However, the disclosure does not provide any details about how this improvement can be achieved.

Commonly-assigned U.S. Patent Application Serial No. (Attorney docket no. 27946-00353), which has been filed on the same day as the present application, discloses a method and apparatus for providing a "prime" uplink signal from a MS whose position is to be determined. The present invention is related by subject matter to the above-described Patent Applications and teaches how to process a repeated uplink signal, such as, for example, the "prime" uplink signal from a MS whose position is to be determined.

The CME 20 System, which is a Global System for Mobile Communications (GSM) implementation manufactured by Telefonaktiebolaget LM Ericsson, sends uplink messages with a Timing Advance (TA) to compensate for the radio signal propagation delay caused by the distance between the radio base station (BS) and the MS. The TA value is determined by a procedure of selecting the smallest TA value from a number of measurements made by the BS on several access bursts that have been transmitted by the MS. For TA value determinations, this procedure solves the radio signal multipath propagation problem (i.e., when the signal propagates along a line of sight path and also along one or more reflected paths). This procedure is hereinafter referred to as the "minimum time" method.

SUMMARY OF THE INVENTION

A problem addressed by the present invention is how to process a number of identical digital signals transmitted from a radio transmitter (TX), which are subject to noise and multipath propagation when received in a radio receiver (RX), in order to more accurately determine the distance between the TX and RX than what is possible using the above-described "minimum time" method.

Another problem addressed by the present invention is how to process the above-described digital signals if the signal parameter being determined in the RX is the TOA.

Still another problem addressed by the present invention is how to process the above-described digital signals if the signal parameter being determined in the RX is the TOA, and there are TOA and DOA measurements being made in a BS.

It is, therefore, an object of the present invention to provide a method and apparatus to more accurately determine the distance between an RX and TX, by processing radio signals that have been subject to noise and multipath propagation, wherein the radio signals are being transmitted repeatedly from the same TX and received in an RX.

It is another object of the present invention to provide a method and apparatus in accordance with the above-described object, whereby the signal parameter being processed is TOA.

It is yet another object of the present invention to provide a method and apparatus in accordance with the above-described objects, whereby the signal parameters being processed are TOA, TDOA and DOA.

The foregoing and other objects are achieved by a method and apparatus for improving time measurement accuracy, which includes transmitting "M" samples of the same signal from a TX, receiving the "M" signal samples along with multipath components and noise, for each of the received "M" samples, determining in the RX an estimated channel power profile (CPPi), selecting "N" out of the "M" received samples, performing incoherent integration of the CPPi for the "N" samples, which results in an integrated signal, ICPP(Ni), determining if the signal-to-noise quality of the ICPP(Ni) is greater than or equal to a predetermined threshold value, and if not, improving the signal-to-noise quality of ICPP(Ni) as required, by redoing the incoherent integration with successively one additional received sample CPPi until the signal-to-noise quality of the ICPP(Ni) is greater than or equal to the predetermined threshold value, determining the TOA(i), including the case of determining TOA (i) from the maximum signal amplitude, and entering that TOA(i) value into a diagram that shows a frequency of occurrence as a function of TOA(i), repeating the whole procedure "X" times by selecting a new combination of "N" out of "M" samples, which results in "X" additional points in the frequency of occurrence diagram, and reading the minimum value TOA(min) as the time value having "z" of all occurrences with higher TOA(i) values and "1–z" of all occurrences with lower TOA(i) values, where z>0.7.

An important technical advantage of the present invention is that the method for improving the quality of the signals, which requires the addition of many signals (incoherent integration), is performed in such a way that also allows the minimum TOA to be determined as in the "minimum time" approach described above.

Another important technical advantage of the present invention is that the elimination of noise thus provided allows more remote BSs to take part in determining the position of a MS, which not only improves the accuracy of each measurement made, but also improves the accuracy overall because of the increased number of BSs that can participate in the position determination process.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–7 of the drawings, like numerals being used for like and corresponding parts of the various drawings.

Essentially, the present invention provides a method for making time measurements which can be used in determining the geographical position of a mobile radio terminal. As such, the time measurements involved can be TOA measurements or Time Difference of Arrival (TDOA) measurements. The following description discloses an embodiment of the invention wherein TOA measurements are preferably used.

Figure 1:
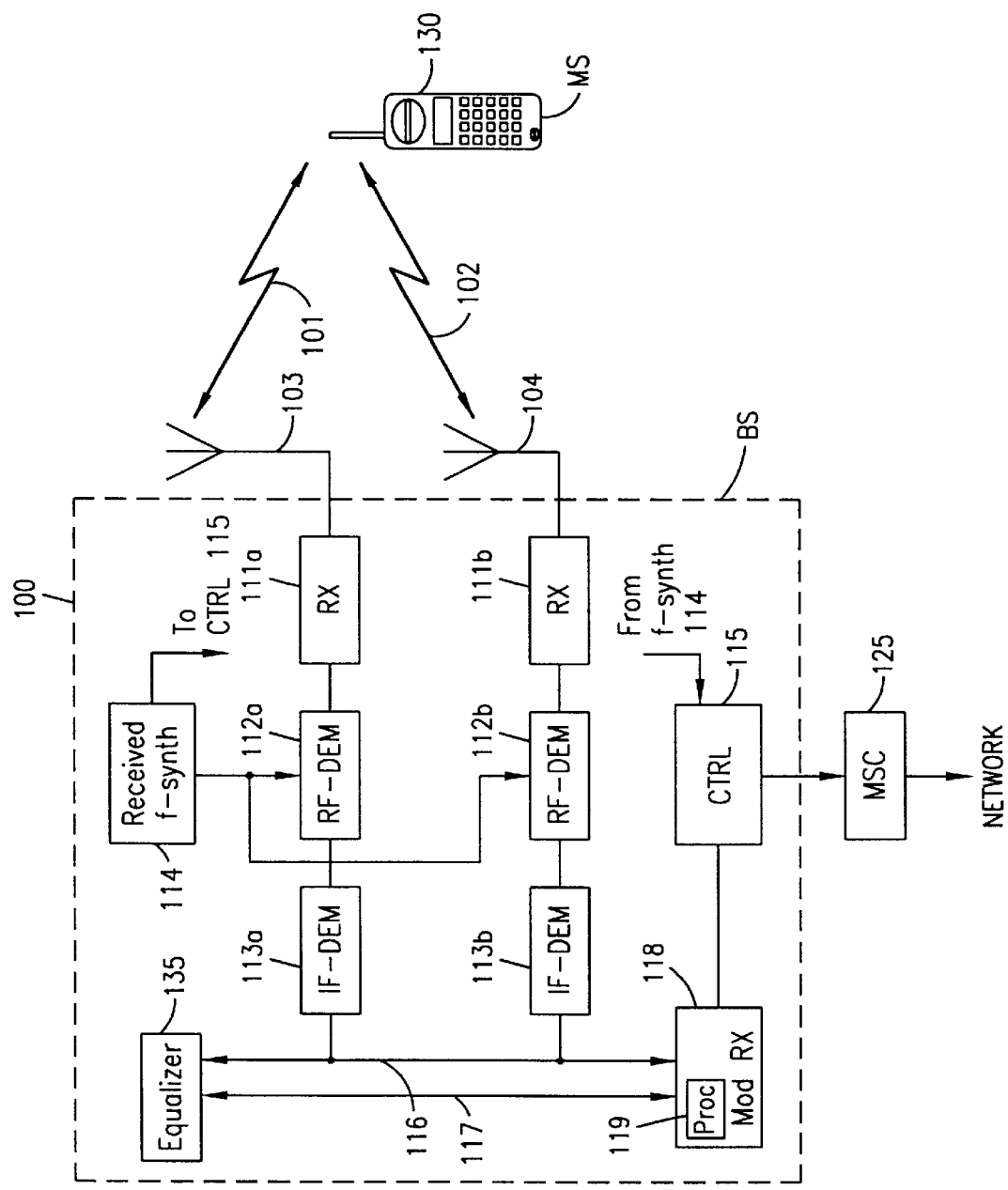
FIG. 1 is a schematic block diagram of a radio BS that can be used to perform measurements for determining TOA, in accordance with a preferred embodiment of the present invention.

Specifically, FIG. 1 is a schematic block diagram of a radio BS that can be used to perform measurements for determining the TOA of signals, in accordance with a preferred embodiment of the present invention. As shown, the BS 100 can be connected for communication with a wire-bound network (not explicitly shown) via a mobile services switching center (MSC) 125. As shown, the BS 100 performs TOA measurements for a mobile radio terminal (MS) 130 over a radio connection, of which the two uplink paths 101, 102 are shown that provide diversity. For a cellular mobile radio BS, it is common to include two receiving antennas (e.g., 103 and 104) which provide this uplink diversity. Associated with each antenna 103 and 104 is a respective receiver 111a and 111b, radio frequency (RF) demodulator 112a and 112b, and intermediate frequency (IF) demodulator 113a and 113b. A received frequency synthesizer 114 is connected to each of the RF demodulators 112a and 112b and control unit 115. The received frequency synthesizer 114 enables reception of particular radio channels using these connections. Demodulated signals from the IF demodulators 113a and 113b are coupled to an equalizer 135 over respective connections 116 and 117. Although not explicitly shown, the equalizer is also connected to other components in the BS 100.

The demodulated signals from the IF demodulators 113a and 113b are also coupled to a modified-RX (ModRX) 118. The ModRX 118, the function and operation of which are described in the above-mentioned U.S. patent application Ser. No. 08/894,466 to Hagerman et al., functions to measure the TOA of the signals received from the MS 130, and reports the results of these measurements to the MSC 125 via a connection to the control unit 115. Preferably, the processing of the TOA measurements is performed by the processor 119 in the ModRX 118. Alternatively, the processing of the TOA measurements can be performed by a processor in control unit 115, or in the wire-bound network (e.g., in the MSC 125).

The equalizer 135 combines the two demodulated signals on connections 116 and 117, in order to take advantage of both the incoming line-of-sight and reflected radio energy. On the other hand, the ModRX 118 processes these two demodulated signals separately, because signal fading is a desired effect when measuring TOA. In other words, the fading eliminates reflected beams for some received bursts, and thus provides only the desired line-of-sight signals.

Figure 2A:
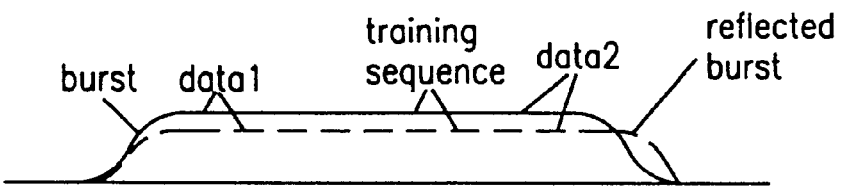
FIGS. 2A–2E illustrate a series of wave-forms associated with a method for determining a sample TOA(i), which can be implemented in accordance with the preferred embodiment of the present invention.

FIGS. 2A–2E illustrate a series of wave-forms associated with a method for determining a sample TOA(i), which can be implemented in accordance with the preferred embodiment of the present invention. The wave-forms shown in FIG. 2A represent one burst of the received signal on connection 116 (or 117), which contains variable data 1 and data 2, as well as a training sequence (known in advance) in the middle of the burst. The solid wave-form represents a direct (line-of-sight) received signal, and the dotted wave-form represents a received reflection of the burst (thus slightly delayed in time).

Figure 2B:
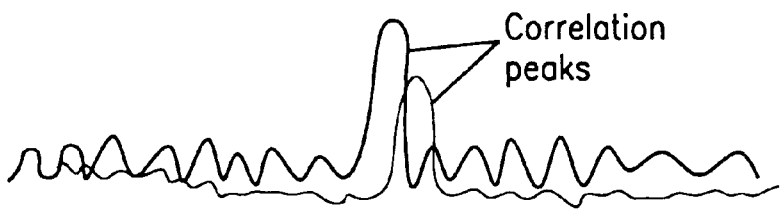
Figure 2C:

The wave-forms shown in FIG. 2B illustrate the theoretical responses of a correlation between the incoming direct and reflected bursts of the signal on connection 116 (or 117), and the known training sequence available in the ModRX 118 for determining TOA. The combined correlation response ("Channel Impulse Response" or CIR) of these bursts as processed in the ModRX 118, is shown in FIG. 2C. The suffix "i" indicates a particular received burst.

The CIRi wave-form shown in FIG. 2C is a complex value comprising amplitude and phase. The central part of the CIRi is given by a limited number of samples (e.g., 5), but a complete signal as shown in FIG. 2C is reconstructed by the processor 119 using a conventional interpolation technique.

Figure 2D:
Figure 2E:
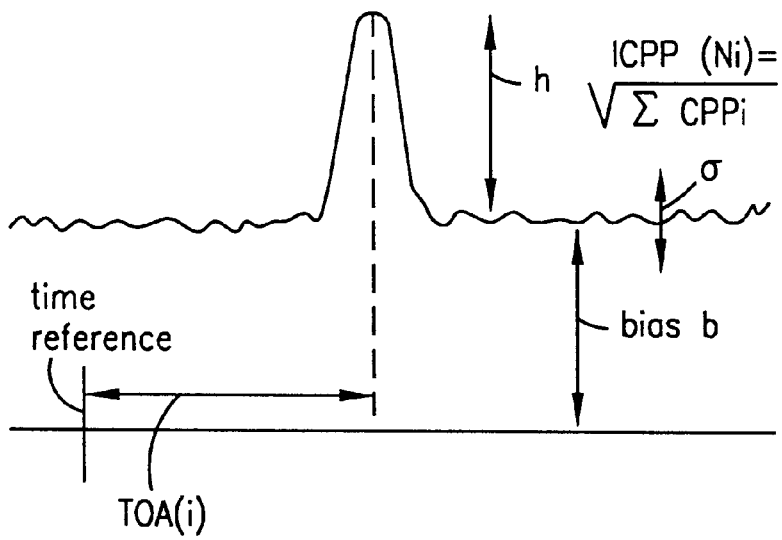

The wave-form shown in FIG. 2D illustrates the squared absolute value of the CIRi, which is referred to as the "estimated channel power profile" or CPPi. The wave-form depicted for the CPPi is optimistic, and in actual cases often contains a large noise component. Consequently, N out of M (e.g., M=70) CPPi are integrated into a signal ICPP(Ni), as shown in FIG. 2E.

The integrated signal ICPP(Ni) has a higher peak value, h, for the desired signal, and a bias value, b, for the undesired noise, but with a spread sigma for the noise that is not amplified to the same extent by the integration. The bias value, b, is eliminated during processing, and the quality "Q" of the ICPP(Ni) is defined as h/sigma. A suffix, Ni, assigned to the Integrated Channel Power Profile ICPP(Ni) indicates that a certain selection "i" of N bursts has been integrated. A TOA(i) value is associated with the ICPP(Ni) and is entered as one of 100 points, for example, in the diagram shown in FIG. 3.

Figure 3:
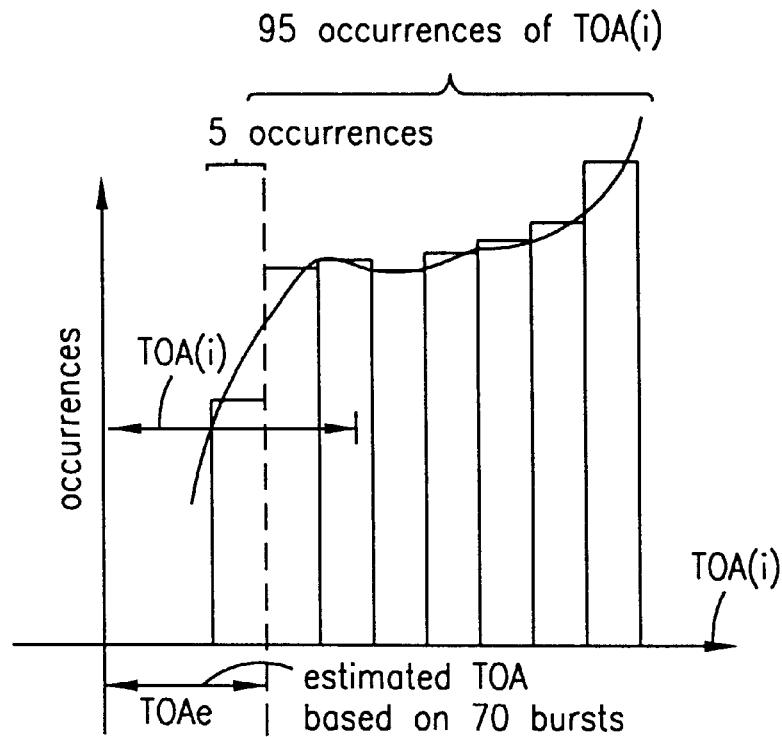
FIG. 3 is a diagram that can be used to derive an estimated minimum Time of Arrival or TOAe based on seventy bursts from a TX, in accordance with an exemplary embodiment of the present invention.
Figure 5:
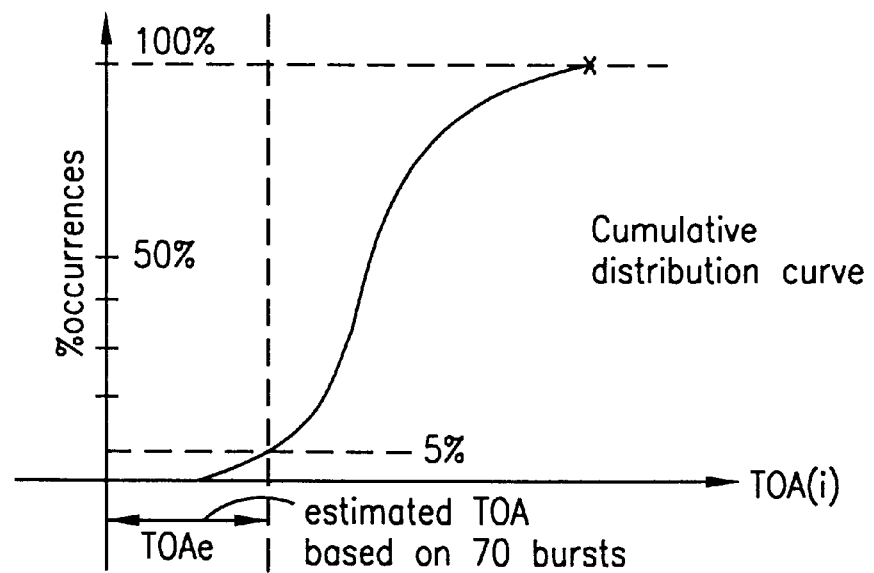
FIG. 5 is a diagram of an alternative representation for the diagram of FIG. 3, and which shows a cumulative distribution curve for the same bursts.

FIG. 3 is a diagram that can be used to derive the estimated minimum time of arrival (TOAe) based on 70 bursts, in accordance with an exemplary embodiment of the present invention. Although FIG. 3 discloses a diagram that can be used to plot TOA(i) versus frequency of occurrence, it is shown as a diagram for illustrative purposes only and is not intended to so limit the present invention. In an automated processing environment, the diagram of FIG. 3 can be implemented, for example, as a multi-dimensional matrix or array, with the rows (or columns) including each TOA(i), and the columns (or rows) including each occurrence. An alternative representation is given in FIG. 5, which shows a cumulative distribution curve for the same 70 bursts.

The present invention preferably uses M (e.g., 70) received bursts containing at least a part that has identical known contents of bits in all received bursts (e.g., a training sequence). However, note that a different embodiment can use (e.g., 70) received bursts containing different (non-identical) information, but information still known to the receiver, which enables the processor to produce CIRi by correlating each burst with its known contents.

Using a first procedure, the noise is reduced to a preselected level by "adding" (e.g., incoherent integration of the CPPi) a required number of N bursts which are randomly selected from among the M received bursts, and determining the TOA(i) for this sum, ICPP(Ni), of N bursts. This first procedure is repeated a plurality (e.g., 100) times, which for this example, results in 100 values of TOA(i) which are entered into the diagram show in FIG. 3. The primary advantage of this first procedure is that the random selections, Ni, will sometimes comprise bursts that contain mostly (or only) bursts received on the shortest path (line-of-sight path). Using a second procedure, the minimum TOAe is read in the diagram shown in FIG. 3. However, the shortest values of TOA(i) are excluded because they may be due to noise and multipath effects displacing peaks. Empirical information shows that a suitable reading for TOAe is where 5% of the occurring TOA(i) are earlier than the TOAe, and 95% of the occurring TOA(i) are later than the TOAe.

Figure 4:
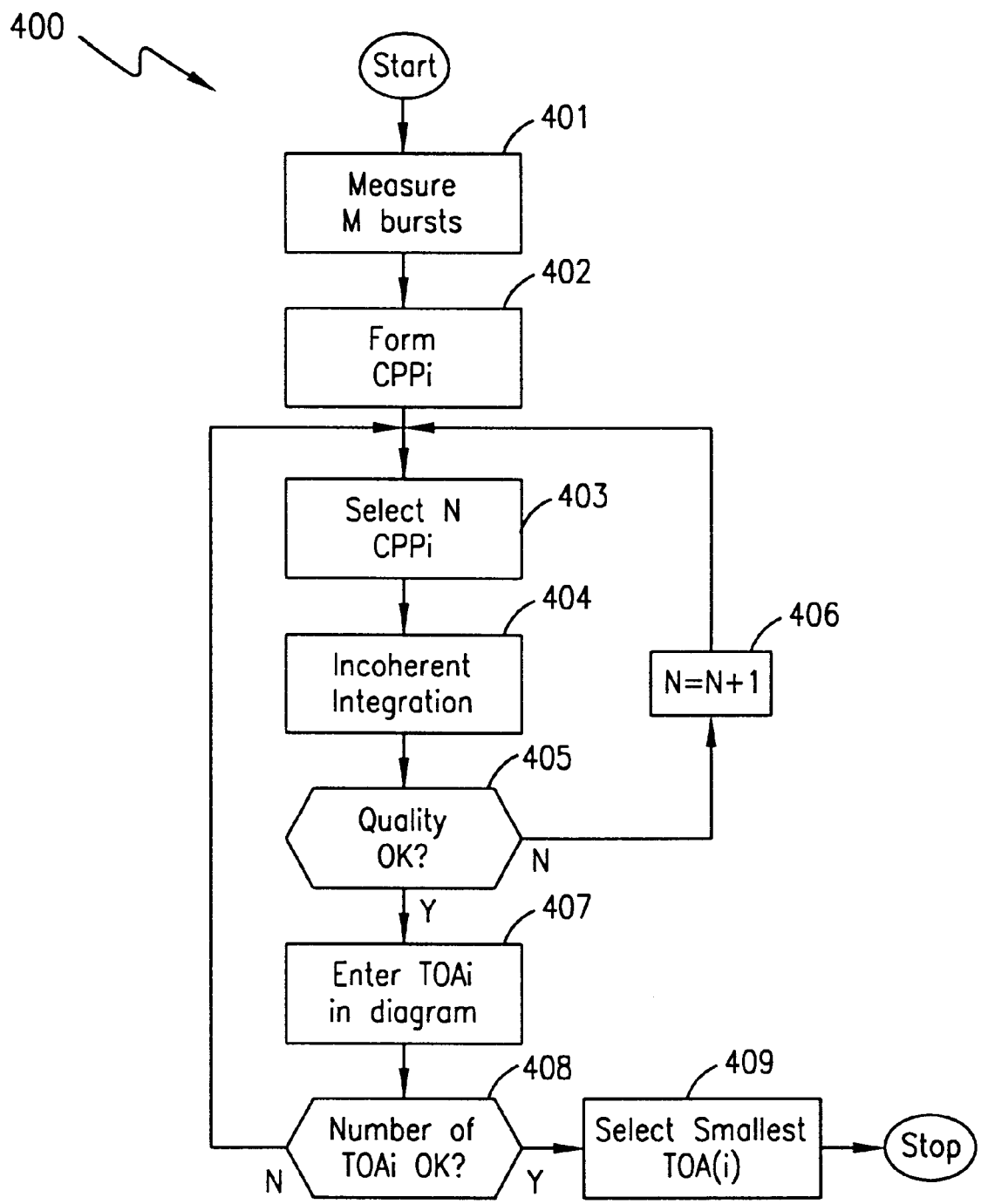
FIG. 4 is a flow diagram that can be used to implement an exemplary embodiment of the present invention.

FIG. 4 is a flow diagram that illustrates an exemplary method 400 that can be used to implement the present invention. At step 401, M bursts of the received signal at connection 116 (or 117) that contain a known bit sequence are measured by ModRX 118. For example, these bursts can be access bursts sent on the uplink from the MS 130 as a response to an intra-cell handover order, or a handover order back to the pertinent (old) traffic channel, with the order coming from a serving BS (e.g., 100) in a GSM network. If these access bursts are not answered by the BS 100, up to 70 bursts will be transmitted by the MS 130 before a time-out occurs and places the MS back on the previously used (old) traffic channel. The demodulated signals on connections 116 and 117 both include the received access bursts, or together 2×70=140 bursts maximum, each of which can be treated as an independent burst with respect to the method of the present invention.

At step 402, the received channel impulse responses, CIRi (as shown in FIG. 2C), which are each associated with one particular burst and contain complex information, are each processed to form an estimated channel power profile, CPPi (as shown in FIG. 2D) equal to the squared absolute value of the CIRi. Consequently, there will be M values of CPPi. At step 403, the processor 119 randomly selects N out of the M values (wave-forms) of the CPPi starting with N=10, for example.

At step 404, an incoherent integration of the N=10 selected wave-forms CPPi results in one integrated channel power profile ICPP(Ni), as shown in FIG. 2E. At step 405, a check is made to determine whether the noise has been reduced enough for the derived ICPP(Ni) to have a minimum quality defined by the ratio h/sigma (compare FIG. 2E) If the h/sigma ratio is less than a predetermined threshold, the derived ICPP(Ni) has to be improved by repeating the steps 403–405 using one additional CPPi randomly selected from among the not yet selected CPPi. At step 407, the minimum quality has been reached, and the resulting TOA(i) (as shown in FIG. 2E) is entered into the diagram shown in FIG. 3. The flow then continues to step 408.

At step 408, the question is answered about whether or not the predetermined number of TOAi values has been reached. If not, the steps 403–407 are repeated as described above, until the required predetermined number of TOAi values has been reached.

If so, at step 409, the lowest TOA(i) in the diagram of FIG. 3 is selected, because this value of TOA represents the TOA of the burst as received on the shortest path (line-of-sight path). However, the selection is performed according to the description for FIG. 3 or 5 above, thereby rejecting the influence of noise.

In another embodiment of the present invention, TDOA is measured instead of TOA. For the TDOA measurements, the procedure is the same as the procedure described above for TOA, except that time measurements are made relative to another signal rather than relative to a time reference. If TDOA measurements are performed, the cross-correlation of two received signals can be performed. As such, the TDOA estimate can be the highest peak of the cross-correlation output.

Also, if TDOA measurements are performed, the above-described inventive incoherent integration approach can also be used. However, two base stations should be involved, in order to have two signals to perform the TDOA measurement. As such, the cross-correlation output can be substituted for the CIR, and the cross-correlation power profile can be substituted for the CPP (where the CPP represents the squared absolute value of the cross-correlation output).

In another embodiment, if DOA measurements are performed, a spatial signature can be estimated from, for example, the received signal from a directional- or narrow-beam antenna (e.g., an adaptive antenna or fixed lobe antenna. As such, the DOA estimate can be the highest peak of the estimated spatial signature.

The above-described inventive incoherent integration approach can also be used if DOA measurements are performed. As such, the spatial signature can be substituted for the CIR, and the spatial signal power profile can be substituted for the CPP (where the CPP represents the squared absolute value of the spatial signature).

In both the TDOA and DOA measurement cases, the line-of-sight (LOS) signal component corresponds to the "center of gravity" of the ICPP (i.e., the LOS component does not correspond to the lower part of the correlation output, such as in the TOA measurement case). Consequently, there would be little or no advantage in performing incoherent integration with less than the total number, M, of the received bursts. Therefore, in these cases, all bursts are used in the incoherent integration process, and the TDOA and DOA estimates are the "center of gravity" of the ICPP.

In yet another embodiment of the present invention, an antenna array is used in a BS for measuring beams from different directions separately. Subsequently, the line-of-sight beam is selected for the TOA measurements (shortest TOAi).

In still another embodiment of the present invention, the occurrences of TOA(i) are weighted by their quality (i.e., by their h/sigma value), which is an indication of the noise involved. Consequently, remote BSs receiving weak signals are given less influence over a position determination process.

Figure 6:
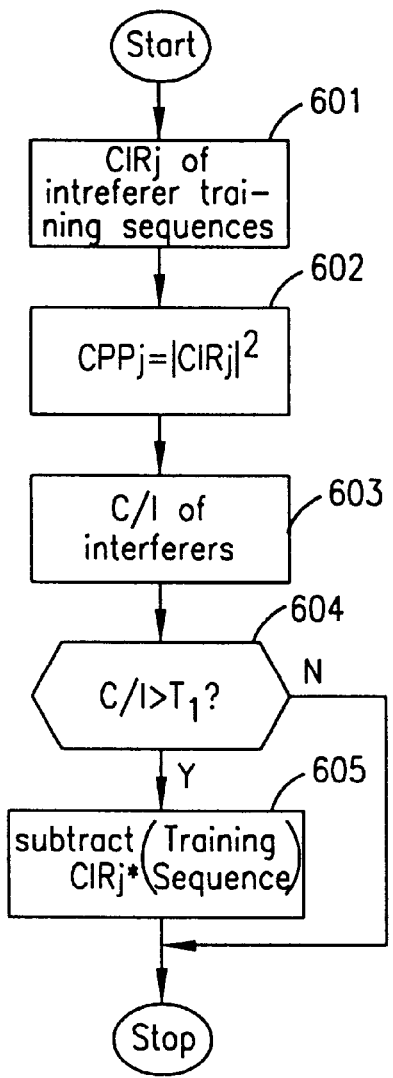
FIG. 6 is a flow diagram that illustrates a first auxiliary method, for rejecting interference in accordance with the present invention.

FIG. 6 is a flow diagram that illustrates a first auxiliary method, for rejecting interference in accordance with the present invention. This method teaches how to overcome disturbances from other mobile terminals (e.g., whose position is not being determined). For example, in the GSM, there are eight different training sequences used which have a certain correlation to each other, and can cause disturbances to the measurements performed for a mobile terminal whose position is being determined.

At step 601 of the method, the channel impulse responses, CIRj, are estimated for all possible interferer training sequences on all M received bursts. At step 602, the corresponding channel power profiles, CPPj, are formed, by taking the squared absolute value of the CIRj. At step 603, the average carrier-to-interference ratio, C/I, is estimated for each such interferer training sequence, while treating the "C" part as the power of the interferer of interest and the "I" part as the power of other signals. At step 604, a determination is made about whether the disturbance is to be rejected (i.e., subtracted) from the received bursts, which is the case if the C/I exceeds a first threshold value, T1. At step 605, those training sequences that meet the condition of step 604 are convoluted (symbolized by a "*") with the CIRj, and subtracted from the received bursts.

Figure 7:
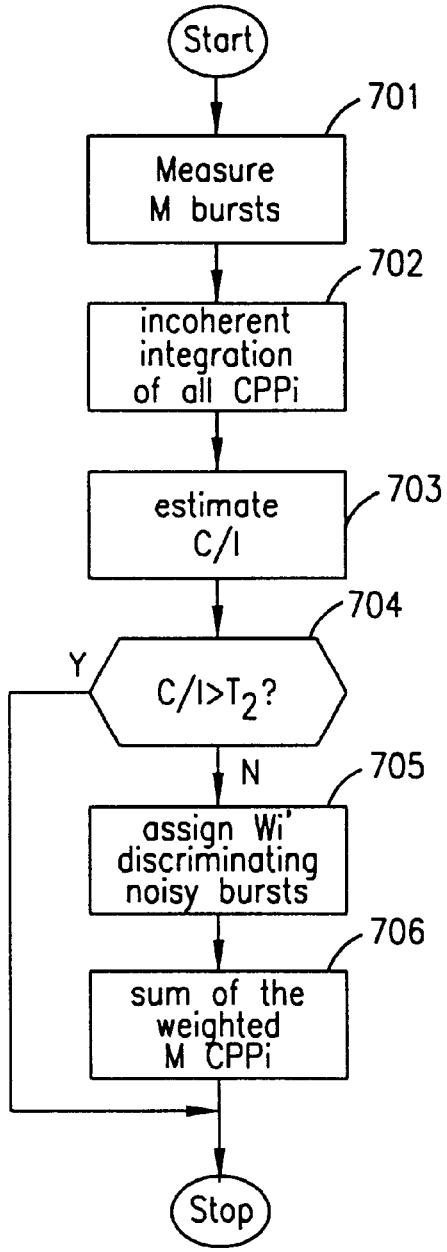
FIG. 7 is a flow diagram that illustrates a second auxiliary method, for detecting the measurement region in the time domain, in accordance with the present invention.

FIG. 7 is a flow diagram that illustrates a second auxiliary method, for detecting the measurement region in the time domain, in accordance with the present invention. For example, this method is particularly useful in cases of high noise compared to the signal of interest. As such, before searching for correlation peaks (as shown and described above with respect to FIG. 2B), there can be a problem with determining the approximate time when the training sequences are found among the noise. This second auxiliary method comprises incoherently integrating all M bursts received, which results in a relatively wide pulse that emerges from the noise, and indicates the approximate time when the training sequence of the measured mobile terminal (whose position is being determined) is to be found.

At step 701 of the method, the channel power profiles, CPPi, of the received carrier are formed for all M bursts. At step 702, the incoherent integration of all the CPPi is performed, and the highest peak corresponds to the location of the training sequence. At step 703, the C/I is estimated, while treating the "C" part as the power of the carrier, and the "I" part as the power of other signals. At step 704, a determination is made about whether the result from steps 701–702 is acceptable (C/I>T2), or the noise is strong enough such that additional steps have to be taken for an acceptable result. If, at step 704, the value of C/I is above the threshold T2, the result from steps 701–702 is accepted. Otherwise, the bursts with high influence from noise are weighted down as follows. At step 705, the bursts with high energy contents (which are likely due to noise) are discriminated by assigning them a low weight factor, Wi', and the bursts with low energy contents are assigned a high weight factor for Wi'. At step 706, a sum of all M weighted bursts is formed in accordance with the formula:

$$\sum_{i=1}^{M} (Wi' \cdot CPPi). \tag{1}$$

The highest peak of this sum corresponds to the location of the training sequence.

The principle of assigning weights to the received bursts depending on the C/I can also be applied to the processing of measured bursts in order to determine a time of arrival, TOAe. The training sequence can be used to estimate the power of the signal as represented by FIG. 2D, and the power of the signal plus noise as represented by FIG. 2A. Then, weights W" can be assigned to each CPPi (i.e., W" CPPi in FIG. 2D), based on these estimated signal power and signal plus noise power, before forming the integrated signal, ICPP(Ni), and the square root of this signal, as depicted in FIG. 2E.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims. In particular, the methods described and claimed herein for uplink applications can be used alternatively for downlink applications.

What is claimed is:

1. A method for determining, in a radio environment with time dispersion, the distance between a radio transmitter and a radio receiver, comprising the steps of:

transmitting from said radio transmitter M samples of a signal;

receiving in said receiver said M samples together with multipath components and noise;

determining an estimated channel power profile for each of said M samples;

selecting a first set of N samples from said M samples;

performing incoherent integration for said estimated channel power profiles for said first set of N samples to form a first integrated signal;

if a quality level of said first integrated signal with respect to signal to noise is less than a predetermined threshold, selecting another sample from said M samples;

performing incoherent integration for said estimated channel power profiles for said first set of N samples and said another sample to form a second integrated signal;

if a quality level of said second integrated signal with respect to signal to noise is greater than or equal to said predetermined threshold, determining a time-of-arrival of a maximum level of said second integrated signal;

entering said time-of-arrival into a time-of-arrival versus frequency of occurrence array;

selecting a second set of N samples from said M samples;

repeating all of said performing through said entering steps for said second set of N samples; and determining a minimum value estimated time-of-arrival from said array.

2. The method of claim 1, wherein the step of determining a minimum value estimated time-of-arrival from said array comprises reading out from said array a time value having a first predetermined number of all occurrences being higher time-of-arrival values, and a complement of said first predetermined number of all occurrences being lower time-of-arrival values.

3. The method of claim 2, wherein said first predetermined number is greater than 70%, and said second predetermined number is 100% minus said first predetermined number in percent.

4. The method of claim 1, wherein the receiving step comprises receiving said M samples separately in two independent radio receivers to form 2 times said M samples.

5. The method of claim 1, wherein said array comprises a matrix.

6. The method of claim 1, wherein a manual version of said entering step comprises entering said time-of-arrival into a time-of-arrival versus frequency of occurrence diagram.

7. A method for determining the distance between a mobile station and a base station in a mobile network, comprising the steps of:

transmitting from said mobile station a first plurality of signal samples;

receiving at said base station said first plurality of signal samples;

forming an estimated channel power profile value for each of said first plurality of signal samples;

selecting a second plurality of samples from each said estimated channel power profile value;

integrating said estimated channel power profile value for said second plurality of samples to form a first integrated channel power profile;

if a quality level of said first integrated channel power profile is less than a predetermined threshold value, selecting at least one additional sample from each said estimated channel power profile value;

integrating said estimated channel power profile for said second plurality of samples and said at least one additional sample to form a second integrated channel power profile;

if a quality level of said second integrated channel power profile is greater than or equal to said predetermined threshold value, determining a time-of-arrival for a maximum of said second integrated channel power profile;

entering said time-of-arrival into a time-of-arrival versus frequency of occurrence array;

selecting a third plurality of samples from each said estimated channel power profile value;

repeating said integrating through said entering steps for said third plurality of samples; and determining a minimum time-of-arrival from said array.

8. The method of claim 7, wherein said integrating steps comprise incoherent integration.

9. The method of claim 7, wherein said minimum time-of-arrival represents a shortest distance between said mobile station and said base station.

10. The method of claim 7, wherein the step of determining a minimum time-of-arrival comprises reading out from said array a time value having a first number of all occurrences being higher time-of-arrival values, and a complement of said first number of all occurrences being lower time-of-arrival values.

11. The method of claim 10, wherein said first number is greater than 0.7, and said complement of said first number is 1 minus said first number.

12. A method for determining, in a radio environment with time dispersion, a distance between a radio transmitter and a radio receiver, comprising the steps of:

transmitting from said radio transmitter M samples of a signal;

receiving in said radio receiver said M samples together with multipath components and noise;

selecting a first set of N samples from said M samples to form a mathematical function of said N samples, varying the number for N iteratively such that said mathematical function of said N samples preserves time information and reduces said noise to a first predetermined value, said first predetermined value indicating a desired level of said signal relative to said noise;

creating additional sets of N samples from said M samples, by repeating said selecting step and starting each said repeating step with a different random and independent set of N samples, and terminating said repeating step when a number of said additional sets of N samples comprises a second predetermined value;

determining a time-of-arrival for each of said first set and said additional sets of N samples;

storing each said time-of-arrival in a time-of-arrival versus frequency of occurrence array; and determining an estimated time-of-arrival from said time-of-arrival versus frequency of occurrence array.

13. A method for performing, in a radio environment with time dispersion and noise, a determination of an earliest time-of-arrival for a known received signal transmitted repetitively as M samples from a remote transmitter, said M samples subject to fading such that a time-of-arrival varies between at least two of said M samples, comprising the steps of:

selecting from among said M samples a first set of samples;

forming a mathematical function from said first set of samples to improve a signal-to-noise quality without destroying time-of-arrival information;

repeating said selecting and forming steps for additional sets of samples in addition to said first set of samples;

determining a time-of-arrival for each of said first set and said additional sets of samples; and statistically processing each said time-of-arrival obtained from said determining step to obtain an estimate of said earliest time-of-arrival.

14. The method of claim 13, wherein said first set of samples and said additional sets of samples comprise an equal number of N samples.

15. The method of claim 13, wherein said first set of samples and said additional sets of samples comprise different numbers of samples.

16. The method of claim 13, wherein a number of samples used in said first set of samples and said additional sets of samples is selected to obtain a desired signal-to-noise quality for each of said first set of samples and said additional sets of samples.

17. The method of claim 13, wherein a number of samples used in said first set of samples and said additional sets of samples is selected to obtain a desired signal-to-noise quality defined by h/sigma.

18. A system for use in determining the distance between a mobile station and a base station in a mobile network, comprising:

a mobile transmitter for transmitting a first plurality of signal samples;

a base station receiver for receiving said first plurality of signal samples; and a processor coupled to said base station receiver, said processor operable to:

form an estimated channel power profile value for each of said first plurality of signal samples;

select a second plurality of samples from each said estimated channel power profile value;

integrate said estimated channel power profile value for said second plurality of samples to form a first integrated channel power profile;

select at least one additional sample from each said estimated channel power profile value if a quality level of said first integrated channel power profile is less than a predetermined threshold value;

integrate said estimated channel power profile for said second plurality of samples and said at least one additional sample to form a second integrated channel power profile;

determine a time-of-arrival for a maximum signal amplitude of said second integrated channel power profile if a quality level of said second integrated channel power profile is greater than or equal to said predetermined threshold value;

enter said time-of-arrival into a time-of-arrival versus frequency of occurrence array;

select a third plurality of samples from each said estimated channel power profile value;

repeat the first integrate operation through the enter operation for said third plurality of samples; and determine a minimum time-of-arrival from said array.

* * * * *

UNITED STATES PATENT AND TRADEMARK OFFICE
CERTIFICATE OF CORRECTION

PATENT NO. : 6,009,334
DATED : December 28, 1999
INVENTOR(S) : Grubeck, et. al.

It is certified that error appears in the above-identified patent and that said Letters Patent is hereby corrected as shown below:

Column 1, line 14   Replace "08/917,577"
With --08/894,466--

Signed and Sealed this

Tenth Day of April, 2001

Attest:

NICHOLAS P. GODICI

*Attesting Officer*   Acting Director of the United States Patent and Trademark Office